United States Patent Office 3,354,619
Patented Nov. 28, 1967

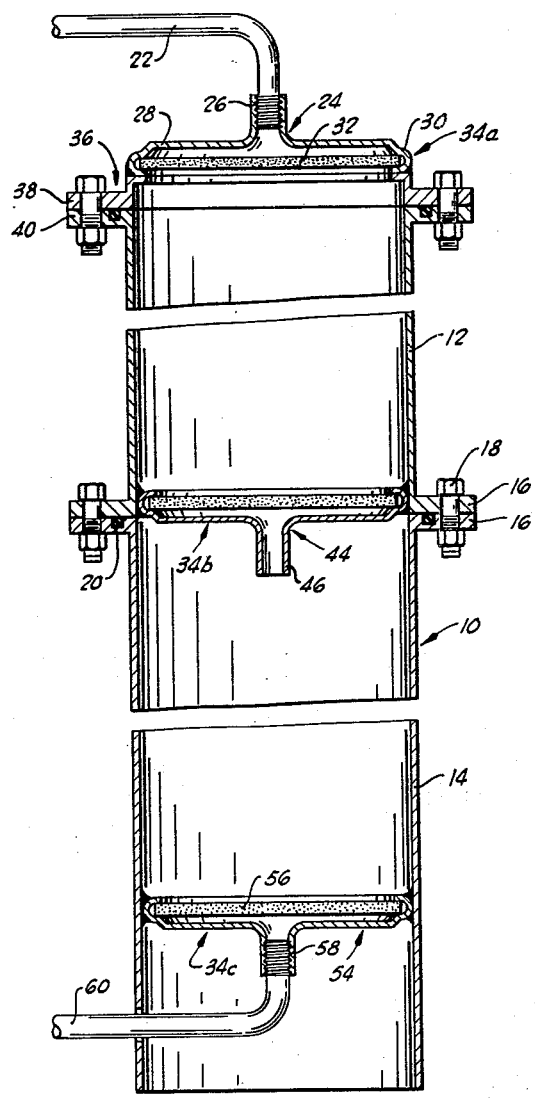
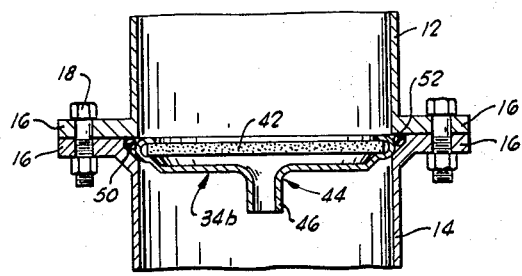

3,354,619
VAPOR PHASE CHROMATOGRAPHY SYSTEM
Alfred B. Carel, Ponca City, Okla., assignor to Continental Oil Company, Ponca City, Okla., a corporation of Delaware
Filed Aug. 23, 1963, Ser. No. 304,103
14 Claims. (Cl. 55—197)

This invention relates to vapor phase chromatography systems. More particularly, but not by way of limitation, the present invention relates to improvements in tubular column assemblies utilized in vapor phase chromatography for the purpose of chromatographically resolving a mixture of gaseous materials into its several components by passage through the column.

Vapor phase chromatography is now a well known and widely used analytical and preparative technique which, in all of its forms of usage, is based upon the principle of resolving or separating a mixture of gaseous components into the individual molecular species in such mixture by passing the mixture through a chromatographic column. The column is generally an elongated tubular member which may be a double-walled annular column or a single-walled cylindrical column. In either case, the chromatographic column is packed with a solid material or a solid substrate which is coated with a liquid film, and the function of such packing materials is to separate the components of the gaseous mixture passing therethrough by exhibiting a differential or selective affinity for the various individual components of the mixture. By reason of these differences in the affinities or partition coefficients of the various components of the mixture with respect to the column packing material, the mixture is resolved into its several components in the course of passage through the column so that the components of the mixture are eluted from the column in a sequence which is determined by their varying absorptivities upon the column packing material.

As will be appreciated by those conversant in the art of vapor phase chromatography, one of the aspects of analytical or preparative vapor phase chromatography which is a subject of continuous efforts at improvement is the sharpness of resolution or division which is provided by the column when it is used to segregate the several components of a mixture of vapors or gases. Departures from ideality in the effectiveness of resolution obtained with a given column are manifested in several ways, most of which are clearly observable when a strip chart recording instrument is used to record the elution of the resolved components through a thermal conductivity cell or other suitable detecting device. Thus, as the several components which have been segregated by the column pass through the detecting instrument, peaks are recorded upon the recorder chart which correspond to the components passing through the detector, and the departure of such peaks from a symmetrical appearance may be indicative of a failure of the column to effect separation of components of the mixture in an optimum manner. In some instances, the phenomena of tailing is observed in which the peaks develop a gradual, horizontally tending slope at their trailing edge, with the tail or trailing edge of the peak extending into the leading edge of the peak which represents the next successive component to be eluted from the column. Tailing of the type described indicates a failure to effect a clean-cut separation between the two components. In other instances, humps are formed upon otherwise symmetrical peaks inscribed upon the recorder chart and may be indicative of the presence of some contaminating material in an otherwise pure component being eluted from the column.

Where departures from peak symmetry of the type described occur, the asymmetrical shape of the peaks may be due to the presence of impurities in the major component responsible for the peak, or may be due to lack of sufficient component resolution as described above. In this event, the distortions in the recorder trace resulting in the asymmetry of the peak are said to be real. On the other hand, departures from peak symmetry may be due to uneven elution of the same component, and not the result of inefficient resolution by the column or the presence of impurities in the eluted component. Asymmetry of this type may be described as artifactual or artificial. In this event, though the actual resolving power of the column may be satisfactory, the inability of the interpreter of the chart trace, without further investigation, to identify the departures from symmetry as real or artifactual makes interpretation of the recorded data difficult and frequently inaccurate.

The present invention comprises an improvement in vapor phase chromatographic columns which enhances the symmetry of peaks recorded upon a continuous recorder chart and representative of the several components in a gaseous mixture passed through the column and resolved thereby. The improvement in peak symmetry is effected by the invention whether the asymmetry reduced or eliminated is real or due to the presence of artifacts. In other words, in columns in which the degree of resolution obtained is not optimum and some overlapping or tailing of peaks is experienced as a result of such inefficient resolution, the invention improves the resolving power of the column and, in doing so, imparts a greater degree of separation and symmetry to the peaks which are representative of the components eluted from the column. On the other hand, where the humps and assymmetric shape of the peaks are due to the presence of artifacts in the eluted components, the present invention also appears to improve the symmetry of the peaks. The reduction in artifactual distortions of peak symmetry by the present invention is believed to be in part due to a reduction in the degree of channeling which may occur in the column packing material.

In one of its broader aspects, the present invention contemplates the positioning in a chromatographic column of a gas sparging device which comprises a thin porous disc fitted into a shallow, funnel-shaped housing with the disc and housing having a diameter substantially equal to the diameter of the column. The sparger is placed across the line of gaseous flow through the column or, stated differently, extends normal to the longitudinal axis of the column. In a preferred embodiment of the invention, at least three spargers are employed in the column. The sparger which is uppermost in the column, and therefore most nearly adjacent the end of the column to which the gaseous sample is admitted, functions to distribute the sample evenly over the entire cross sectional area of the column and assure an even frontal movement of all portions of the sample through the column as the sample passes into and through the uppermost portion of the packing material. The uppermost sparger also has the effect of permitting a larger sample to be efficiently introduced to the column and thus is particularly useful in preparative chromatography where relatively large samples of from 1 ml. to 100 ml. or larger are charged to the column.

In the illustrated three-sparger column assembly of the invention, another of the spargers is located at the lower end of the column and functions as a collection unit which receives the eluted components and channels them into a takeoff conduit for conveyance to a suitable detecting device, such as a thermal conductivity cell. The lowermost sparger functions as a support for the column packing material and, by virtue of the pressure drop across the porous disc of the sparger, reduces or prevents channeling in the packing material which may contribute to either real or artifactual asymmetry in the recorded peaks representative of the eluted components.

The third sparger which is used in the illustrated embodiment of the invention is positioned intermediate the upper and lower spargers and is preferably spaced a substantial vertical distance from each. A function of the intermediate or central sparger is to reorient or reshape the leading edge of resolved components moving through the column so that there is less variation in the rate and time at which the component is eluted from the column, and thus less departure from symmetry in the recorder peaks representative of the component. The intermediate or central sparger reorients the leading edge of the resolved components moving through the column by retarding the movement of the most advanced portion of the leading edge which is located adjacent the walls of the column, and permitting the trailing portion of the leading edge which is in the center of the column to advance more rapidly through the column than the thus retarded advanced portions of the leading edge. The intermediate sparger also channels the component advancing through the column through the central spout of the funnel portion of the sparger and thus reconcentrates the component in the center of the column so that there is less opportunity for distortion of the leading edge of a resolved component from a plane extending transversely with respect to the column.

Although I have determined that the employment of the three spargers positioned in a chromatographic column in the manner described affords pronounced improvement in recorder peak symmetry, and a great enhancement of component resolution, I have further found that the use of any one of the three spargers individually affords some improvement in the symmetry of the recorder peaks which are produced. Thus, in instances, where, for economic or other reasons, the use of a plurality of spargers is undesirable, a substantial advantage, particularly in preparative chromatography, may be realized through the use of any one of the three spargers located in the respective positions in the column which have been described.

In addition to the embodiments of the invention in which one, two and three spargers are employed in a chromatographic column in the manner described, additional spargers may be employed between the upper and lower sparger in substantially the same manner as is characteristic of the use of the single intermediate sparger heretofore described. The use of plural intermediate or central spargers is particularly desirable where a column of either relatively great length or diameter is utilized, and the need for reorienting the leading edge of the several resolved components at frequent intervals over the entire length of the column is encountered.

From the foregoing description of the invention, it will have become apparent that it is a major object of the present invention to provide a vapor phase chromatography system in which the components are resolved in a more pronounced and/or uniform manner, and therefore produce more symmetrical peaks on a recorder chart used to visually portray the elution of the components from the column.

A more specific object of the present invention is to improve the resolving power of a chromatographic column so that better separations of the several components of the gaseous mixture charged to the column may be obtained.

A further object of the present invention is to provide an improved chromatographic column which elutes resolved components of a gaseous sample passed therethrough in narrower, more concentrated bands whereby such components may be more accurately depicted and analyzed.

An additional object of the present invention is to provide a chromatographic column which is especially useful in preparative vapor phase chromatography in that larger samples may be injected into the column and separated thereby into their components with better resolution than is characteristic of previous types of chromatographic columns.

Yet another object of the present invention is to provide an improved chromatographic system in which the traces inscribed upon a recorder chart as a result of the passage of components of a mixture separated by the column through a suitable detecting device are in the form of symmetrical peaks, thereby permitting a greater certainty in the evaluation and analysis of such peaks.

An additional object of the present invention is to provide a preparative chromatographic column in which large samples may be more uniformly introduced to the inlet of the column whereby an even initial frontal movement along the column is assured.

Another object of the present invention is to provide an improved chromatographic column of the type used in vapor phase chromatography which is relatively inexpensive to install and is characterized by a long and trouble-free operating life.

In addition to the foregoing described objects and advantages of the invention, other desirable features and beneficial aspects of the invention will become apparent to the reader as the following detailed description of the invention is read in conjunction with a perusal of the accompanying drawings.

In the drawings:

FIGURE 1 is a vertical sectional view through the center of a chromatographic column in which three sparging devices have been installed in accordance with the present invention.

FIGURE 2 is a sectional detail view illustrating an alternative method of installing a sparging device between sections of a chromatographic column.

Referring now to the drawings, in detail, and particularly to FIGURE 1, reference character 10 designates generally a chromatographic column constructed in accordance with the present invention. As is well understood in the art, such columns are frequently constructed of a tubular or cylindrical member. The column 10 is preferably divided into a plurality of tubular column sections, such as those designated by reference characters 12 and 14 in FIGURE 1. The column sections 12 and 14 are connected together by registering flanges 16 using bolts 18 or other suitable securing means. The escape of gases or vapors from the column by elution between the flanges 16 is prevented by an O-ring seal 20 which may be installed between the flanges 16 in any suitable manner, such as by placing the O-ring 20 in a groove in one of the flanges as illustrated in FIGURE 1.

As will be understood by those skilled in the art, the serially connected sections 12 and 14 which make up the chromatographic column are, in use, filled or packed with a suitable separatory packing material which may be either a particulate solid, or a particulate solid which carries in a thin layer on the surface thereof, a suitable liquid developer or separating agent. In either event, the packing material is characterized in having a different affinity for the several components of the gaseous mixture introduced to the column so that by passage of the gaseous mixture through the column, those components of the mixture which are more strongly adsorbed on the solid or in the liquid are retained longest in the column, and are thereby separated from the components of the mixture which are characterized by a lesser affinity for the packing material. For convenience of illustration, the packing material has not been illustrated in FIGURES 1 and 2 of the drawings.

In accordance with the present invention, a vaporized or gaseous sample is introduced to the upper end of the column by a suitable vapor inlet conduit 22 which is threaded into, or otherwise satisfactorily connected to, an inverted, funnel-shaped member designated generally by reference character 24. The funnel-shaped member 24 includes a spout or neck 26 which is connected to the sample inlet conduit 22 and a flat pan portion 28. The flat pan portion 28 is turned over at its peripheral edge as indicated by reference character 30, and the turned over edge 30 receives the peripheral edge of a perforate or porous disc 32 which is spaced from the under side of the flat pan portion 28 so as to create a chamber 31 therebetween. The porous disc 32 may suitably be constructed of fitted glass or ceramic material, or more preferably, micro metallic porous stainless steel. The funnel-shaped member 24 and the porous disc 32 retained therein by the construction illustrated in FIGURE 1 are together referred to hereinafter as a sparger or sparging device. Spargers of the general type described are commercially available and may be obtained, for example, from the Micro Metallic Corporation of Glen Cove, New York. Inasmuch as sparging devices of the type constituted by the funnel-shaped member 24 and the porous disc 32 are, in some embodiments of the invention, used at a plurality of locations in the chromatographic column, such sparging devices will hereinafter be designated generally by reference character 34 in order to simplify the description of the invention. The sparging device at the top of the chromatographic column 10 is designated 34a.

The sparger 34a is secured to the top of the upper section 12 of the chromatographic column 10 by welding the sparger to a suitable adapter section 36 which includes an annular flange 38 which registers with and is bolted to a similar flange 40 formed at the upper end of the tubular section 12. Other methods of positioning the sparger 34a at the upper end of the section 12 of the chromatographic column 10 may be employed, provided a gas tight seal is established between the outer peripheral edge of the sparger and the internal wall of the column.

In one embodiment of the invention, two sparging devices 34 are employed in the column in addition to the unit located at the top thereof. Thus, a second sparging device 34b is located intermediate the upper and lower ends of the column and may be conveniently positioned at the lower end of the top or uppermost tubular section 12. The intermediate sparging device 34b is constructed substantially identically to the uppermost sparging device 34a and includes a porous disc 42 and a funnel-shaped member 44. It will be noted that the intermediate sparging device 34b is oriented in the column with the spout 46 of the funnel-shaped member 44 depending downwardly in the column. The function of this arrangement will be subsequently explained.

The intermediate sparging device 34b may be welded in the upper tubular section 12 of the column in the manner illustrated in FIGURE 1, or it may be loosely positioned within the upper end of the lower tubular section 14 with its outer peripheral resting upon a tapered shoulder 50 formed in the lower tubular section 10 at the upper end thereof in the manner illustrated in FIGURE 2. In the latter construction, a groove is defined between the outer periphery of the intermediate sparging device 34b and the flange 16 at the upper end of the lower tubular section 14. An O-ring or other suitable sealing member 52 is positioned in the groove and forms an effective seal between the upper and lower column sections 12 and 14, and also forms a seal around the outer periphery of the intermediate sparging device 34b to prevent the gaseous sample from by-passing the porous disc 42 as it passes from the upper tubular section 12 into the lower tubular section 14.

A third sparging device 34c comprising a funnel-shaped member 54 and a porous disc 56 is located at the lower end of the column and is positioned with its spout 58 turned downwardly. The spout 58 is threadedly or otherwise suitably connected to a discharge conduit 60 which conveys the eluted components of the sample to a detecting unit of one of the types well known in the art. The lowermost sparging device 34c is welded or otherwise suitably secured to the internal wall of the lower tubular section 14 so as to prevent gas from leaking around the peripheral edge of the sparging device and by-passing the porous disc 56.

*Operation*

In the operation of the chromatographic column of the invention, a sample which has previously been vaporized is introduced to the top of the column via the sample inlet conduit 22. The gaseous sample consisting of a mixture of several individual vaporized compounds flows through the neck or spout 26 of the funnel-shaped member 24 and disperses into the space defined between the flat pan portion 28 and the porous disc 32. The porosity of the disc 32 is such that a pressure drop is established across the disc and flow of sample into the column is retarded. Thus, the space between the disc 32 and the flat pan portion 28 will be completely filled with the sample and the sample will be evenly distributed across the entire cross sectional area of the column at the top thereof. Due to the uniformity of sample distribution at the top of the column, the sample moves downwardly in the column with an oven frontal movement. Moreover, the retention of the sample in the space between the porous plate or disc 32 and the flat pan portion 28 permits a larger sample to be more evenly introduced to the chromatographic column than can be introduced directly using hypodermic syringes or other devices of the type conventionally used to inject large quantities of sample to the inlet end of a chromatographic column without benefit of the sparging device 34a.

As the gaseous mixture moves downwardly in the chromatographic column, the mixture is resolved into its several components by reason of the different adsorption coefficient of these components in the column packing material. Also, with the resolution of the mixture into its several components, the leading edge, or line of farthest advance downwardly in the column, of each of the several components will become distorted due to the fact that the portion of the leading edge which is adjacent the wall of the column will move downwardly in the column more rapidly than that portion of the leading edge which is in the center of the column. In other words, the frontal pattern assumed by each component as it moves through the column will generally resemble an inverted U or V. The phenomenon of more rapid advancement of the leading edge of a separated component at the walls of the chromatographic column than at the center thereof is well known to those skilled in the art. It is also recognized that the gases adjacent the wall of the column are generally warmer than those at the center of the column, particularly, of course, where the column is heated above ambient temperatures.

A function of the intermediate sparger 34b is to reshape the front or leading edge of the components passing through the column so that the leading edge is more nearly equally advanced at all points across the column. The intermediate sparging device 34b also functions to mix the hotter gases adjacent the peripheral wall of the column with the cooler gases moving through the center of the column along the column axis. The precise manner in which these results are brought about through the use of the intermediate sparger is not known with certainty. It is postulated, however, that as the more advanced portion of the leading edge which is adjacent the column wall reaches the porous disc 42 of the intermediate sparger 34b, this portion of the leading edge is retarded in its movement downwardly in the column by virtue of the small diameter of the pores through the porous disc 42 and the pressure drop which exists across the disc 42. Moreover, the funnel-shaped member 44 of the sparger 34b channels the leading edge of the resolved component which is adjacent the wall of the column in toward the center of the column and, in so doing, causes this portion of the component to move through a greater distance than the distance through which the central portion of the leading edge must move in order to reach the spout 46. Of course, in funneling the peripheral portions of the leading edge into the spout 46 along with the central portion of the leading edge of the component, the hot gas at the peripheral portion is mixed with the cooler gas in the central portion so that all of the gas making up the resolved component tends to acquire a uniform temperature.

As previously explained, it may be desirable in relatively long columns to include additional intermediate sparging devices 34b for the purpose of reorienting the leading edges of, and mixing, the gas in, the several separated components several times during their flow through the column. It should also be pointed out that the use of one or more intermediate spargers 34b is particularly desirable in a column of large diameter since the distortion which occurs in the leading edges of the components is proportional to the diameter of the column. In other words, the leading edge of the component which is adjacent the wall of the column tends to become separated from the central portion of the leading edge in proportion to the distance by which the column axis is separated from the wall of the column.

The third sparging device which is used in a preferred embodiment of the invention is the bottom or lowermost sparging device 34c. The sparging device 34c is welded or otherwise suitably secured in the lower end of the lowermost tubular section 14 and provides a supporting structure for supporting the column packing material. Additionally, the lowermost sparging device 34c performs the functions which have been ascribed to the intermediate sparging unit in that the configuration of the leading edge of the components reaching the lowermost sparging unit is changed to permit the portion of the component moving axially in the column to catch up with the portion of the leading edge of the component which is adjacent the column wall. Also, the cooler centrally located gas is blended or mixed with the warmer gas adjacent the column wall to impart an even temperature to all the gas in the component as it is eluted from the column. The uniformity of temperature imparted to the component by this mixing action results in a more uniform or symmetrical signal or pulse being sensed by a detecting unit (not shown), which is in turn reflected in an improvement in the symmetry of the peak registered on a recorder chart.

It should also be pointed out that because of the pressure drop which is developed across the porous disc 56 of the lowermost sparging unit 34c, the total rate of movement of the components through the column is retarded and the tendency for vertical channels to develop in the packing material as the sample flows therethrough is inhibited. Since channeling is one cause of inefficient separation, and may also be responsible to some extent for artifactual asymmetry in the recorded peaks, the function of the lowermost sparging unit 34c and, to a lesser extent, the intermediate sparging unit 34b in reducing or obviating channeling is a very desirable feature of the present invention.

In using the chromatographic column constructed in accordance with the present invention, the employment of either the uppermost or lowermost sparging unit, 34a or 34c, respectively, is effective to substantially improve the symmetry of the peaks scribed upon a recorder chart and representative of the individual components eluted from the column. However, the maximum improvement in peak symmetry and in component resolution is obtained when at least one intermediate sparging unit 34b is incorporated in the column. Moreover, as hereinbefore described, where the column is relatively long, or is of relatively large diameter, the utilization of a plurality of intermediate sparging units 34b further increases the effectiveness of the column.

Although the chromatographic column of the invention has been described in considerable detail and certain specific embodiments of the invention have been illustrated and described as exemplary of the manner in which the principles underlying the invention may be practically employed, those skilled in the art will undoubtedly perceive a variety of ways in which the specific embodiments herein described may be modified or altered without an abandonment of the principles upon which the invention is founded. It is therefore intended that all such modifications and innovations as do not depart from reliance upon the basic principles of the invention as the same are defined by the appended claims or reasonable equivalents thereof shall be deemed to be circumscribed by the spirit and scope of the invention.

What is claimed is:

1. A vapor phase chromatographic system comprising:
    (a) an elongated tubular column having an open inlet end and an open discharge end;
    (b) a first gas sparging device positioned at the inlet end of said column means and extending transversely across the axis of said column, said first gas sparging device comprising:
        (1) a generally funnel-shaped member having a spout extending away from said column in coaxial alignment with said column; and
        (2) a porous disc positioned in said funnel-shaped member across the axis of said funnel-shaped member;
    (c) a second gas sparging device positioned intermediate the ends of said tubular column and extending transversely across the longitudinal axis thereof, said second gas sparging device comprising:
        (1) a generally funnel-shaped member having a spout extending toward the discharge end of said column means in coaxial alignment with said column; and
        (2) a porous disc positioned in said funnel-shaped member across the axis of said funnel-shaped member;
    (d) a third gas sparging device positioned at the lower end of said tubular column and extending transversely across the axis of said tubular column, said third gas sparging device comprising:
        (1) a generally funnel-shaped member having a spout extending toward the discharge end of said column in coaxial alignment with said tubular column; and
        (2) a porous disc positioned in said funnel-shaped member across the axis of said funnel-shaped member;
    (e) means for introducing a gaseous mixture to the spout of said first gas sparging device; and
    (f) a conduit connected to the spout of said third gas sparging device for receiving gas eluted from said tubular column means through said third gas sparging device.

2. A vapor phase chromatographic system as defined in claim 1 wherein said porous discs are stainless steel.

3. A vapor phase chromatographic system comprising:
    (a) a first tubular section having an upper end and a lower end;
    (b) a second tubular section having an upper end and a lower end and connected at its upper end to the lower end of said first tubular section by a gas-tight connection;
    (c) a first gas sparging device secured across the upper end of said first tubular section and comprising:
        (1) a funnel-shaped member having a flat, pan portion extending normal to the axis of the column, said flat, pan portion having a curvilinear, overturned peripheral edge portion sealingly connected to the internal wall of the first tubular section; and
        (2) a foraminous member positioned in said funnel-shaped member and extending parallel to said flat, pan portion with its peripheral edge engaged by the curvilinear edge portion of said funnel-shaped member;
(d) a second gas sparging device adjacent the gas-tight connection between said first and second tubular sections and comprising:
  (1) a generally funnel-shaped member having a flat, pan portion extending normal to the aligned axes of the tubular sections, said flat, pan portion having a curvilinear, overturned peripheral edge portion sealingly connected to the internal wall of one of said tubular sections; and
  (2) a foraminous member positioned in said funnel-shaped member and extending parallel to said flat, pan portion with its peripheral edge engaged by the curvilinear edge portion of said funnel-shaped member;
(e) a third gas sparging device secured across the lower end of said second tubular section and comprising:
  (1) a funnel-shaped member having a flat, pan portion extending normal to the aligned axes of the tubular sections, said flat, pan portion having a curvilinear, overturned peripheral edge portion sealingly connected to the internal wall of said second tubular section; and
  (2) a foraminous member positioned in said funnel-shaped member and extending parallel to said flat, pan portion with its peripheral edge engaged by the curvilinear portion of said generally funnel-shaped member.

4. A vapor phase chromatographic system as defined in claim 3 wherein said first tubular section is provided with a first, annular, outwardly extending flange around the upper end thereof and further characterized to include an adapter section having an annular flange abutting said first, annular, outwardly extending flange and sealingly secured thereto, and wherein the flat, pan portion of said first sparging device has its peripheral edge portion sealingly secured in said adapter section.

5. A vapor phase chromatographic system as defined in claim 4 wherein said second sparging device is positioned in the lower end of said first tubular section, and wherein the peripheral edge portion of the flat, pan portion of said funnel-shaped portion of said second sparging device is sealingly secured to the internal wall of said first tubular section to assure that gases passing through said column pass through the foraminous member of said second sparging device.

6. A vapor phase chromatographic system as claimed in claim 4:
(a) wherein the internal wall of said second tubular section is relieved adjacent the upper end of said second tubular section to form an annular tapered shoulder,
(b) wherein said second sparging device is positioned in the upper end of said second tubular section with the peripheral edge portion of the flat, pan portion of said second sparging device resting on said tapered shoulder and defining an annular groove with the internal wall of said second tubular section, and
(c) wherein said vapor phase chromatographic system is further characterized to include an annular resilient sealing member in said annular groove and forming a gas-tight seal between said first and second tubular sections, and between the peripheral edge portion of the flat, pan portion of said second sparging device and the internal wall of said second tubular section.

7. A vapor phase chromatographic system comprising:
(a) a chromatographic column including an elongated tubular member containing two zones of separatory material; and
(b) a sparging device positioned transversely across said tubular member intermediate said zones and the ends thereof for retarding the flow of gases through said tubular member and concentrating gases moving through said tubular member adjacent the axis of said tubular member, said sparging device comprising:
  (1) a porous disc member extending across said tubular member normal to the longitudinal axis thereof; and
  (2) substantially unobstructed gas conducting means defining a peripheral seal with said porous disc member and positioned on the downstream side of said disc member as determined by the direction of gaseous flow through said tubular member, said means including an outlet positioned on the longitudinal axis of said tubular disc member for channeling gases sparged through said disc member inwardly toward the longitudinal axis of said tubular member, said outlet defining a gas flow path having a lineal length less than the length of said tubular member.

8. A vapor phase chromatographic column as defined in claim 7 wherein said gas conducting means comprises a flat, centrally apertured pan portion extending across said tubular member in a plane substantially parallel to and spaced from the adjacent surface of said porous member, said pan portion having a curvilinear, overturned peripheral edge sealingly engaging the peripheral edge of said porous member and sealingly engaging the internal wall of said tubular member.

9. A vapor phase chromatographic column as defined in claim 7 wherein said gas conducting means comprises a generally funnel-shaped member having a spout coaxially positioned in said tubular member and projecting toward the discharge end of said tubular member, and further having an open end receiving said porous disc and sealing the periphery of said disc to the internal wall of said column.

10. A vapor phase chromatographic system comprising:
(a) an elongated chromatographic column having an open sample inlet end and an open sample discharge end;
(b) a first gas sparging means positioned adjacent the inlet end of said column for distributing a gaseous sample evenly in said column, said sparging means comprising a gas permeable member and a cover having an outlet therein adjacent said member, a portion of said cover surrounding said outlet and being spaced from said gas permeable member to form a chamber therebetween, said outlet defining a gas flow path having a lineal length less than the length of said column;
(c) a second gas sparging means positioned intermediate the ends of said column and transversely across the longitudinal axis of said column, said sparging means comprising a gas permeable member and a cover defining a peripheral seal with said member and having an outlet therein adjacent said member, a portion of said cover surrounding said outlet and being spaced from said gas permeable member to form a chamber therebetween, said outlet defining a gas flow path having a lineal length less than the length of said column; and
(d) a third gas sparging means positioned adjacent the discharge end of said column across the longitudinal axis of said column for retarding the flow of gases through said column, said sparging means comprising a gas permeable member and a cover having an outlet therein adjacent said member, a portion of said cover surrounding said outlet and being spaced from said gas permeable member to form a chamber therebetween, said outlet defining a gas flow path having a lineal length less than the length of said column.

11. A vapor phase chromatographic system comprising: an elongated conduit defining a gas chromatographic column, having two zones of separatory material;

a gas permeable member intermediate said zones extending transversely across said conduit; and a cover having a centrally located substantially unobstructed outlet therein, mounted in said conduit adjacent said gas permeable member, at least a portion of said cover surrounding said outlet and defining a peripheral seal with said member and being spaced from said gas permeable member to form an unobstructed chamber therebetween, said chamber communicating directly with one of said zones through said unobstructed outlet, said outlet defining a gas flow path having a lineal length less than the length of said conduit.

12. A vapor phase chromatographic column comprising:

an elongated tubular member containing a zone of separatory material and having an open inlet end and an open discharge end; and a sparging device mounted at the discharge end of said tubular member and separate from said separatory material, said sparging device comprising:

a generally funnel-shape member having a substantially unobstructed open tubular spout projecting away from the discharge end of said tubular member and having a receiving end with an opening formed therein, said opening being larger than the opening of said spout, said funnel-shape member being sealingly secured at its periphery to said elongated tubular member, said spout defining a gas flow path having a lineal length less than the length of said tubular member; and a porous disc extending transversely across said tubular member and positioned to form a seal with said opening formed in said funnel-shape member whereby gases passing through said column from the inlet end thereof to the sparging device at the discharge end thereof passes serially through said porous disc and said funnel-shape member.

13. A gas chromatographic system comprising:

a first fluid flow conduit defining a first fluid stream, a first chromatograph separating column having a single bed of separatory material therein and an axis and upstream and downstream ends connected to said first fluid flow conduit to pass said first stream, said first fluid flow conduit being the sole inlet into said chromatographic system, an outlet for said column, first flow modifying means connected to the downstream end of said column for uniformly retarding, concentrating and subsequently directly connecting the flow of said first fluid stream to said outlet, and second flow modifying means connected to the downstream end of said first fluid flow conduit and to the upstream end of said column for uniformly distributing the flow of said first stream over the cross-sectional area of said column, each of said first and second means including substantially unobstructed flow paths for said first stream having axial lengths less than the axial length of said column, thereby to improve the efficiency of said system.

14. A gas chromatographic system comprising:

a first fluid flow conduit defining a first fluid stream, a first chromatograph separating column having a single bed of separatory material therein and an axis and upstream and downstream ends connected to said first fluid flow conduit to pass said first stream, said first fluid flow conduit being the sole inlet into said chromatographic system, means including substantially unobstructed flow dispersion means defining second fluid flow conduit means directly connected in series fluid flow relationship between said first fluid flow conduit and said column, an outlet for said column, means including substantially unobstructed fluid flow collecting means defining third fluid flow conduit means directly connected in series fluid flow relationship between said outlet and said column for uniformly retarding and concentrating the flow of said first fluid stream, each of said first and second means defining axial flow paths for said first stream having lengths less than the axial length of said column.

References Cited

UNITED STATES PATENTS

| | | | |
|---|---|---|---|
| 1,871,226 | 8/1932 | Skala | 55—16 X |
| 2,802,573 | 8/1957 | Weatherly. | |
| 2,826,908 | 3/1958 | Skarstrom | 73—23.1 |
| 2,891,630 | 6/1959 | Hall et al. | |
| 2,958,391 | 11/1960 | De Rosset | 55—16 |
| 2,989,443 | 6/1961 | Martin. | |
| 3,077,103 | 2/1963 | Heaton. | |
| 3,230,167 | 1/1966 | Golay. | |
| 3,250,058 | 5/1966 | Baddour | 55—67 |
| 3,267,647 | 8/1966 | Carel et al. | |

FOREIGN PATENTS 818,703  8/1959  Great Britain.

OTHER REFERENCES

Bayer, E., "Discussions," in Gas Chromatography, ed. by R. P. W. Scott, Butterworths, London, 1960, pp. 236–241.

Van Huyten et al.: "Improvements in the Efficiency of Large Diameter Gas-Liquid Chromatography Columns," in Gas Chromatography, ed. by R. P. W. Scott, Butterworths, London, pp. 224–236.

REUBEN FRIEDMAN, *Primary Examiner.*

C. N. HART, *Assistant Examiner.*